United States Patent [19]
Fieuzal et al.

[11] 3,889,549
[45] June 17, 1975

[54] REVERSIBLE-OUTPUT ROTARY GEAR DEVICE

[75] Inventors: Jean Henri Fieuzal, Rueil Malmaison; Louis Bourgine, Chambourcy; René Pierre Benzoni, Ornesson, all of France

[73] Assignee: Etat Francais, France

[22] Filed: Feb. 22, 1974

[21] Appl. No.: 445,291

[30] Foreign Application Priority Data
Mar. 14, 1973 France .................. 73.09022

[52] U.S. Cl. .................................................. 74/409
[51] Int. Cl. .................................................. F16h 55/18
[58] Field of Search .......................... 74/409, 410

[56] References Cited
UNITED STATES PATENTS
2,895,342  7/1959  Hayhurst .......................... 74/409
3,310,998  3/1967  Harmening .................. 74/409 X

*Primary Examiner*—Leonard H. Gerin
*Attorney, Agent, or Firm*—Stevens, Davis, Miller & Mosher

[57] ABSTRACT

A reversible-output rotary gear drive device for applying two directional rotation to a turret e.g. a gun turret. The device comprises an output gear adapted to apply rotation to the turret, and two input gears selectively driven in dependence upon the desired direction of rotation of the turret. In order to take up play in the coupling between each input gear, when idle, and the output gear, an intermediate gear is provided in a gap between the input gears and applies biasing torque to each input gear when idle so that a previously idle input gear is always in a state of readiness to transmit drive, without play, to effect rotation of the turret.

9 Claims, 5 Drawing Figures

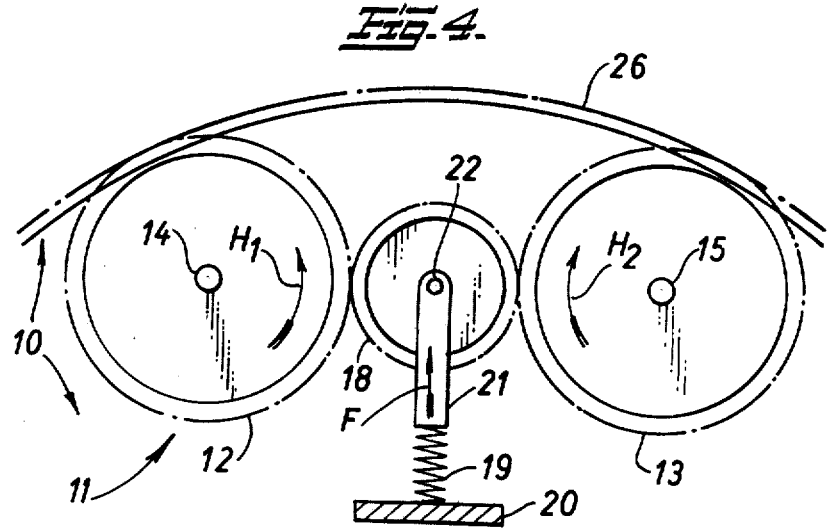
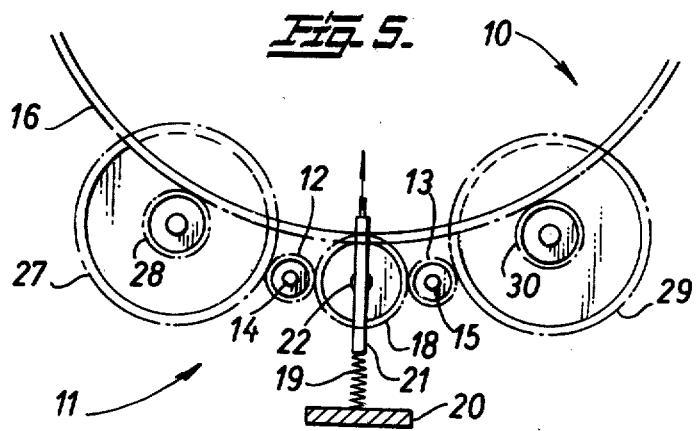

REVERSIBLE-OUTPUT ROTARY GEAR DEVICE

FIELD OF THE INVENTION

This invention relates to a reversible-output rotary gear device having means for taking up play in the gears of the device.

The invention has been developed primary in relation to the provision of a gear device adapted for rotating, in one direction or another, a rotatable member in the form of a turret, particularly a gun turret or cupola mounted in a fixed position or on a vehicle. The turret may be of the type for supporting or shielding a weapon other than a gun. However, it is to be understood that the present invention is not restricted to application in connection with providing rotation for turrets and that the reversible-output rotary gear device according to the invention may be adapted for providing two-directional rotational drive to rotatable members other than (gun) turrets e.g. cranes.

DESCRIPTION OF THE PRIOR ART

It is known to provide a rotary gear device comprising two oppositely rotatable motor units and a driven unit arranged to be driven by one or the other of the two motor units according as to the desired direction of rotation of the driven unit. In the application of such a gear device to a turret or gun turret, the driven unit will consist of, or be connected drivingly to, the turret or gun turret.

In equipment of this kind, it has already been proposed to take up "play" in the gear drive couplings by driving one or the other of the two motors units in such a way as to develop a restoring torque cancelling the play.

Thus, when the driven unit is at rest, the two motor units are driven so as to develop two restoring opposed torques. When the driven unit has to turn in one direction, the motor unit is driven in this direction, which enables it to develop its own nominal torque for ensuring this rotation, and the other motor unit is driven in such a way as to develop a restoring torque opposed to the rotary movememt of the driven unit.

It will be appreciated that the known arrangement described above has great disadvantage due to the fact that the motor units have to be fed constantly at reduced power in order to develop the restoring torque required for cancelling the play; particularly when the motor units are electric motors, the electric motors are subject to a permanent supply at low voltage.

When the driven unit has to remain immobile, it is essential that the two restoring torques be such that there is no drive whatever in one direction or in the other in the driven unit, taking into account the frictional forces; and this condition often calls for the employment of a complicated and delicate servo mechanism.

SUMMARY OF THE INVENTION

According to one aspect of the invention there is provided a reversible-output rotary gear device for applying rotation in either direction to a rotatable member and comprising:

a first gear adapted to apply rotation to said rotatable member;

first and second input gears arranged to define a space therebetween and each coupled with the first gear for relative rotation therebetween, one input gear providing for rotation of the rotatable member in one direction when the other input gear is idle, and said other input gear providing for rotation of the rotatable member in the opposite direction when said one input gear is idle;

an intermediate gear coupled with the first and second input gears and moveable in a first plane in said space between the input gears, said first plane extending transversely of a second plane containing the axes of rotation of the input gears;

and a biasing means applying a force in said first plane to the intermediate gear whereby the teeth of the intermediate gear apply biasing torque to each input gear, when idle, to take up any play in the coupling between said input gear and said first gear.

Thus, by providing for application of biasing torque to each input gear, when idle, it is possible, according to an embodiment of the invention, to ensure that there is no play in the coupling between an input gear and the first gear during change-over from driving the rotatable member in said one direction by means of said one input gear to driving the rotatable member in said opposite direction by means of said other input gear. Moreover, when neither of the input gears is being driven so that the rotatable member is in a state of rest, biasing torque can be applied to both of the input gears whereby play is taken up in the coupling between both of the input gears and the first gear. Thus, the gear device is in a state of readiness for rotation, in either direction, without the necessity for play to be taken up first of all upon rotation of a selected one of the input gears before any relative rotation is generated between said one input gear and the first gear.

The coupling between each input gear and the first gear may comprise a direct meshing connection between the teeth of the input gear and the first gear, or it may comprise one or more gears arranged in driving connection between the input gear and the first gear.

The biasing means applying a force to the intermediate gear may comprise spring means in the form of a tension spring or a compression spring which is anchored to a stop. If desired, the stop may be adjustable in order to vary the value of the force applicable by the spring means to the intermediate gear. The spring means should be capable of exerting a force which, at the least, is of just sufficient value to overcome the frictional forces generated in the bearings supporting the intermediate gear and the input gears.

In so far as the said first gear is adapted to apply rotation to a rotatable member, this may be achieved by coupling the first gear directly with the rotatable member for rotation therewith so that the first gear constitutes an output gear of the device and the input gear may be mounted for rotation at a fixed station or location externally of the rotatable member e.g. a rotatable gun turret. Alternatively, the first gear may be adapted to apply rotation to the rotatable member by being fixed (i.e., non-rotatable) and applying torque through the particular input gear in driving relation therewith, so as to effect bodily rotation of a unit of the rotary gear incorporating the input gears, such unit being coupled with the rotary member to effect rotation of the latter therewith.

BRIEF DESCRIPTION OF THE DRAWINGS

This invention will now be described in more detail, by way of example only, with reference to the accompanying drawing in which:

FIG. 4 is a schematic view, similar to FIG. 2, of a modified arrangement of the embodiment illustrated in FIG. 2; and FIG. 5 is a schematic view of a further modification of the embodiment illustrated in FIG. 2.

DESCRIPTION OF PREFERRED EMBODIMENTS

Figure 1:
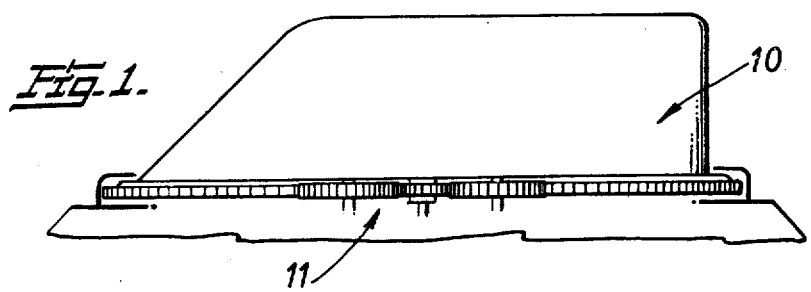
FIG. 1 is a schematic view of a turret provided with a rotary gear device according to the invention.

Referring first of all to FIG. 1 of the drawings, there is shown a rotatable turret or cupola 10 provided with a reversible output rotary drive device designated generally by reference numeral 11. The turret 10 may be adapted for mounting at a fixed location or on vehicle. Various embodiments of rotary gear drive devices (which are suitable for rotating the turret in either direction) will be described in more detail below with reference to FIGS. 2 to 5 of the drawings. However, it is to be understood that the embodiments of rotary gear devices may be employed to rotate members other than turrets or gun turrets. e.g. cranes.

The gun turret 10 is illustrated only schematically in the drawings, though it is to be understood that the turret may be of any suitable conventional construction, the details of which do not form part of the present invention and need not be described further.

Figure 2:
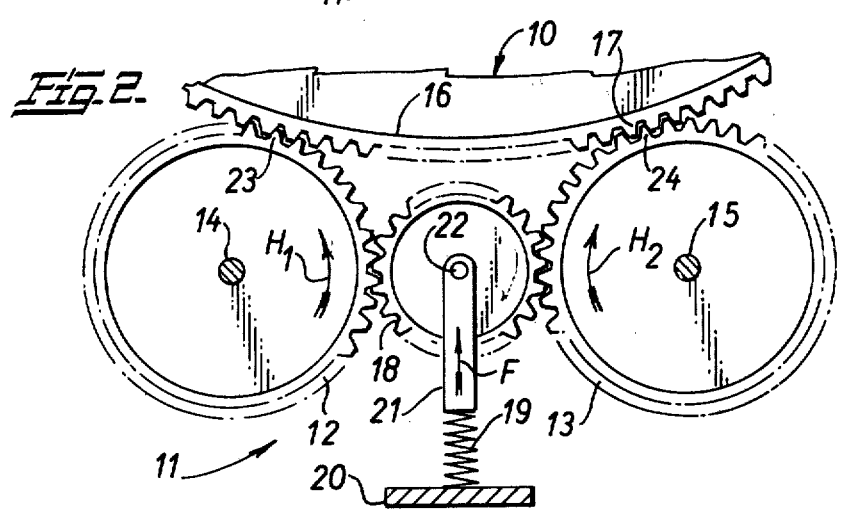
FIG. 2 is a schematic plan view of a first embodiment of rotary gear device according to the invention and suitable for employment with the turret shown in FIG. 1.

Referring now to FIGS. 2, a first gear 16 of the rotary gear drive is mounted at the station and is adapted to apply rotation to the turret 10, and constitutes the output gear of the rotary gear device which will now be described. In this embodiment, the gear 16 is directly coupled with the turret 10 to rotate the latter therewith.

The device is provided with first and second input gears 12 and 13 which are spaced apart from each other and which are arranged to be driven by respective shafts 14 and 15 of motor units (not shown) at a second station. The motor which drives the shaft 14 is arranged to be capable of effecting rotation of gear 12 in the direction of the arrow $H_1$ and the motor which drives shaft 15 is arranged to effect rotation of the gear 13 in the direction of the arrow $H_2$.

It will be noted that both of the input gears 12 and 13 are directly coupled with the output gear 16, though it will be understood that one of the input gears will be driven in order to effect rotation of gear 16 in one direction (with the other input gear running idly), and the other input gear will be driven (with the one gear running idly) in order to rotate the gear 16 in the opposite direction. In the illustrated example of FIG. 2, the output gear 16 takes the form of a toothed ring or toothed wheel 16 which is provided with outwardly extending teeth 17.

In the space between the first and second input gears 12 and 13, there is arranged in intermediate gear 18 which is coupled with the gears 12 and 13 with the respective teeth in mesh, the gear 18 being moveable in a first plane extending generally perpendicular, i.e., transversely to a second plane containing the axes of rotation of the gears 12 and 13. Biasing means is provided to apply a force to the gear 18 in the direction of the plane of movement of the gear (the first plane) so as to apply biasing torque to one or both of the input gears 12 and 13 when the latter are idle or not driven. In FIG. 2, the biasing means comprises a compression spring 19 which acts between a fixed, but adjustable, stop 20 and one end of a yoke 21 which rotatably mounts the intermediate gear 18 on shaft 22 which passes between the ends of the limbs of the yoke 21. The intermediate gear 18 is idly rotatable upon shaft 22 and the spring 19 is capable of applying a force F in the direction of the arrow in FIG. 2 tending to move the intermediate gear 18 radially towards the ring gear 16. Thus, when neither of the input gears 12 or 13 are driven, it will be apparent that the intermediate gears 18 will apply an anti-clockwise biasing torque to the first input gear 12 and a clockwise biasing torque to the second input gear 13.

By applying biasing torques to the input gears 12 and 13 when the latter are not driven or idle, it will be evident from FIG. 2 that the peripheral teeth 23 and 24 respectively of the gears 12 and 13 will be urged into mesh (without play) with the teeth 17 of the ring gear 16. Therefore, upon initiation of rotation of one of the gears 12 or 13 in the direction of the arrows $H_1$ or $H_2$, rotation will be immediately transmitted to the output gear 16 since there will be no play between the teeth of the selected input gear and the teeth 17. Assuming, for the sake of example, that the first input gear 12 is being rotated in the direction of the arrow $H_1$, the output gear 16 will be rotated in a clockwise direction with respect to its axis of rotation (not shown) and the second input gear 13 will thus be driven idly in a direction opposite to the arrow $H_2$ both by its coupling with the ring gear 16, and also the transmission of rotation from gear 12 through intermediate gear 18. During the rotation of the second input gear 13, the teeth 24 will be firmly in mesh with the teeth 17 of the ring gear 16 as shown in FIG. 2. However, upon termination of rotation of the first input gear 12, with consequent action of a brake on the ring gear 16, there will be tendency for the input gear 13 to continue to rotate, by its own inertia, thereby creating play between the previously driving faces of the teeth 17 and the mating surfaces of the teeth 24.

In the absence of the intermediate gear 18 and the biasing means therefore, this would mean that this play would have to be taken up, upon initial transmission of drive to the second input gear 13, before rotation could be transmitted by the gear 13 to the output gear 16 in the opposite direction. This would have a disadvantageous effect in regard to accurate control being exercised over the range of angular movement applied to the output gear which is of particular importance for a gun turret. However, by providing the intermediate gear 18 and the biasing means therefore, upon changeover from one input gear to another input gear e.g. from gear 12 to gear 13, the intermediate gear 18 will apply a biasing torque to gear 13 in a clockwise direction (thereby taking up the play created due to inertia forces when it is running idly and the movement of the turret is braked) before commencement of drive transmission to the gear 13. Thus, the teeth 24 and 17 will be properly in mesh, without any play, upon commencement of rotation of the gear 13.

Similarly, upon termination of drive by one of the input gears 12 and 13, the intermediate gear will apply biasing torque to both gears so as to take up and play which might otherwise develop. Thus, the gear is in a state of readiness to apply drive to the gear 16 in either direction without the necessity for any "play" first to be taken up.

In the arrangement shown in FIG. 2, biasing means is provided to apply force F on the intermediately gear 18 in a first plane extending perpendicular to the second plane containing the axes of the gears 12 and 13. Moreover, when gears 12 and 13 have the same diameter, the plane of movement of the intermediate gear 18 also passes through the axis of rotation of the output gear 16. The biasing means for the intermediate gear, comprising the compression spring 19 acting on the stop 20, is arranged so that the force F is sufficiently large as to overcome frictional forces generated in the bearings supporting the intermediate gear 18 and the first and second input gears 12 and 13. Furthermore, when the output gear 16 is driven in reverse, or upon starting (conditions where maximum torque must be transmitted) no reaction is produced tending to move the intermediate gear 18 closer to, or further against, the force F which is applied to the shaft 22 on which the gear 18 is mounted. Therefore, it will be appreciated that the stiffness or rigidity of the rotary gear transmission is completely independent of the force exerted on the moving shaft 22.

The means provided for taking up play, as described above, only introduce relatively weak frictional forces in the kinematic gear changes for driving the output gear.

Figure 3:
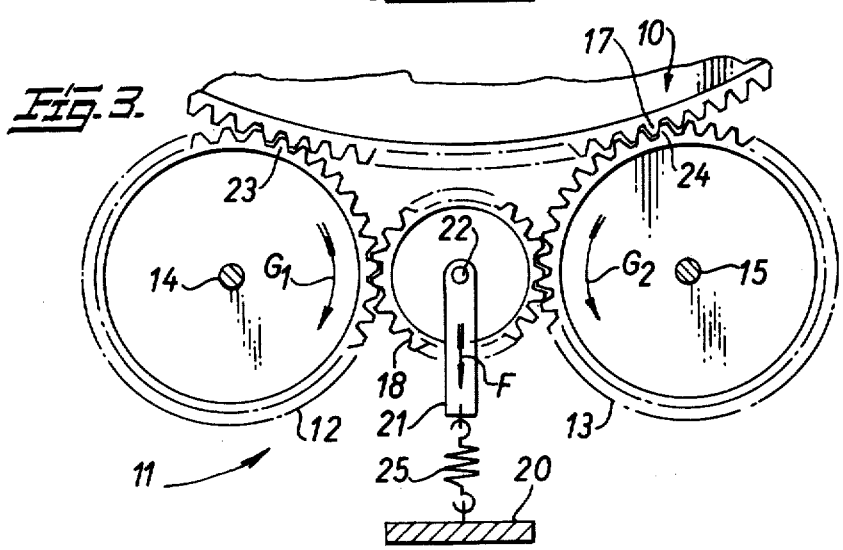
FIG. 3 is a similar view of a second embodiment of device according to the invention.

Referring now to FIG. 3 of the drawings, there is illustrated a second embodiment of the invention which is generally similar to the first embodiment and corresponding parts will be designated by the same reference numerals and need not be described again. In this embodiment, the motor units (not shown) driving the first and second input gears 12 and 13 are so arranged that, when operated, the gear 12 is driven clockwise in the direction of the arrow G1, whereas the gear 13 is driven anti-clockwise in the direction of the arrow G2. In such event, it is necessary for the biasing means applying the force to the intermediate gear 18 to be modified so as to exert force in an opposite direction i.e. radially outwardly from the intermediate gear 18 with respect to the axis of rotation of the output gear 16. Therefore, in this embodiment, the biasing means includes a tension spring 25 which acts between stop 20 and the end of the yoke 21.

The operation of the embodiment illustrated in FIG. 3 is similar to the first embodiment insofar as the intermediate gear 18 and the biasing means therefor apply biasing torque to one of both of the input gears 12 and 13, when idle, in order to take up any play in the coupling between an idle gear and the output gear.

Referring now to FIG. 4 of the drawings, this embodiment of gear device is similar to the embodiment illustrated in FIG. 2 and corresponding parts will be designated by the same reference numerals and need not be described in detail again. However, an important difference is that the rotary gear device is mounted internally of the turret 10, rather than externally thereof as in the embodiments of FIGS. 2 and 3. Furthermore, with the embodiments of FIGS. 2 and 3, the rotary gear device is mounted at a fixed location externally of the turret and is arranged to effect rotation of a first gear coupled directly with the turret for rotation therewith. In the embodiment illustrated in FIG. 4, the rotary gear device is mounted as a unit internally of the turret, but is arranged to be rotatable therewith. Therefore, the input gears 12 and 13 are coupled with the teeth of a first gear 26 which is fixed. Moreover, the gear 26 is provided with inwardly extending teeth (not shown in detail) which mesh with the teeth (not shown) of the gears 12 and 13. The intermediate gear 18 and the biasing means therefor are generally similar to the arrangement shown in FIG. 2 in that a compression spring (19) again is provided. Similarly, upon rotation of input gear 12 in the direction of the arrow H1, clockwise rotation of the rotary gear device as a whole, together with the turret 10, is effected. This is similar to the arrangement in FIG. 2 in that rotation of gear 12 in the direction of the arrow H1 causes clockwise rotation of gear 16 with consequent clockwise rotation of the turret 10 which is coupled therewith.

The intermediate gear 18 and the biasing means therefore are capable of taking up play in the coupling between the gears 12 and 13 and the gear 26 in similar manner to the previous embodiments.

Referring now to FIG. 5 of the drawings, there is shown an embodiment of rotary gear device in which the input gears 12 and 13 are coupled with an output gear indirectly, rather than the direct meshing of gears 12 and 13 with gear 16 or 26 in the previous embodiments. In the embodiment of FIG. 5, the arrangement of the input gears 12 and 13 and the intermediate gear 18 and biasing means therefor is generally similar to the arrangement shown in FIG. 2. However, the input gears 12 and 13 are coupled with the toothed ring 16 through respective gear trains. Thus, the first input gear 12 is coupled with a reduction gear arrangement comprising a large diameter gear 27 which is coupled with a small diameter gear 28 which is in mesh with the teeth of the gear 16. The second input gear 13 is similarly coupled with the gear 16 through the reduction gear comprising a large gear 29 coupled with a small gear 30 in mesh with the gear 16.

Although the input gears 12 and 13 are not in direct mesh with the gear 16, but are coupled therewith through respective gear trains, the intermediate gear 18 and the biasing means therefore function in similar manner in order to take up any play existing in the coupling between an idle input gear (or both) and the gear 16 which provides for rotation of the turret.

Thus, it will be appreciated that the various embodiments of the invention described and illustrated herein provide a reversible-output rotary gear device which is capable of effecting rotation, in either one of two directions, of a rotary member such as a turret or gun turret. This can be achieved either by rotating a (first) output gear coupled fast with the rotatable member, in which case the rotary gear device is mounted at a fixed location. Conversely, the rotary gear device may be mounted as a whole on a rotatable element e.g. a part of the rotatable member (e.g. the gun turret), in which case the input gears of the device engage a stationary gear which reacts, upon rotation of one or the other of the input gears, so as to rotate the rotary gear device as a whole and the rotary member therewith.

When the rotary gear device is adapted for use with a gun turret, it provides advantageously for the motorisation of a turret or gun turret which is intended to be controlled by a firing channel. Actually, the orders for shifting the firing angle supplied by this firing channel can be carried out faithfully without errors due to play. Without provision for play to be taken up, this may add or substract from the values corresponding to the orders.

It will be evident that the first gear (output gear 16) in the embodiments of FIGS. 2, 3 and 5, is adapted to applying rotation to the turret 10 by being rotatably mounted and provided at one station which is coupled directly with the turret so as to rotate the latter when the gear is driven, the input gears 12 and 13 being mounted for rotation about fixed axes provided at a second station. However, the first gear in the embodiment of FIG. 4 is adapted to apply rotation to the turret 10 in that it is non-rotatable and provided at a fixed station, and applies torque, when engaged by input gear 12 or 13, so as to effect rotation of the gear drive unit as a whole (provided at a station rotatable with the turret) and consequently the turret 10 coupled therewith.

We claim:

1. A reversible-output rotary gear device for applying rotation in either direction to a rotatable member and comprising:

a gear, means to mount the same member;

first and second drive gears, means to mount the same with a space therebetween and each coupled with the first driven gear for relative rotation therebetween, means to drive one drive gear in one direction to cause rotation of the first gear in one direction with the other drive gear idle, and means to drive said other drive gear in an opposite direction to cause rotation of the first gear in the opposite direction with said one drive gear idle;

an intermediate gear coupled with the first and second drive gears and moveable in a first plane in said space between the drive gears, said first plane extending transversely of a second plane containing the axes of rotation of the drive gears;

resilient means applying a bias in said first plane to the intermediate gear whereby the teeth of the intermediate gear apply biasing torque to each drive gear, when idle, to take up any play between said drive gear and said first gear, said rotatable member being at least a part of one of said mounting means.

2. A device according to claim 1, in which the resilient means applies force in a radial direction with respect to said axis of rotation of said first gear.

3. A device according to claim 2, in which the resilient means comprises a compression spring, and a stop against which said compression spring reacts, the spring means being arranged to apply a radially inwardly directed force to said intermediate gear.

4. A device according to claim 2, in which the resilient means comprises a tensile spring, and a stop to which the spring is connected, the spring means being arranged to apply a radially outwardly directed force to said intermediate gear.

5. A device according to claim 1, in which said first and second drive gears form a unit which is bodily rotatable whereby the first and second gears are rotatable about respective axes which are rotatable with the unit, and in which said first gear is fixed.

6. A device according to claim 1, including in which the coupling between the drive gears and said first gear is a direct mesh.

7. A rotatable turret provided with a rotary gear drive device for applying rotation in either direction to said turret, said device comprising rotary input means provided at a first station and output means provided at a second station and arranged to apply rotation to said turret, one of said stations being fixed and the other of said stations being rotatable with the turret, in which:

a. said output means comprises a first gear, b. said input means comprises first and second input gears arranged to define a space therebetween and each coupled with the first gear for relative rotation therebetween, one input gear providing for rotation of the turret in one direction when the other input gear is idle and the other input gear providing for rotation in the opposite direction when said one input gear is idle, c. an intermediate gear coupled with the first and second input gears and moveable in a first plane in said space between the input gears, said first plane extending transversely of a second plane containing the axes of rotation of the input gears, d. resilient biasing means applying a force in said first plane to the intermediate gear whereby the teeth of the intermediate gear apply biasing torque to each input gear, when idle, to take up and play between said input gear and said first gear.

8. A turret according to claim 7, in which said first station is fixed and said second station is rotatable with the turret, said first gear being coupled with the turret for rotation therewith and said first and second input gears being rotatable about fixed axes provided by the first station.

9. A turret according to claim 7, in which said first station is rotatable with the turret and said second station is fixed, said first and second input gears forming a unit which is rotatable bodily about an axis provided by the first station and said first gear being fixed at said second station so as to apply rotation to said unit when one of said input gears is driven.

* * * * *